United States Patent [19]

Desrosiers

[11] Patent Number: 5,069,096
[45] Date of Patent: Dec. 3, 1991

[54] ADVANCED SPIDER FIXTURE

[75] Inventor: Michael R. Desrosiers, Westport, Mass.

[73] Assignee: The United States of America as represented by the Secretary of the Navy, Washington, D.C.

[21] Appl. No.: 591,210

[22] Filed: Oct. 1, 1990

[51] Int. Cl.⁵ .................... B23B 23/04; B23B 33/00
[52] U.S. Cl. ............................ 82/151; 142/53; 279/1 L
[58] Field of Search ............... 82/150, 151; 142/53; 279/1 L, 83, 123

[56] References Cited

U.S. PATENT DOCUMENTS

| | | | |
|---|---|---|---|
| 171,082 | 12/1875 | Ballou | 82/150 |
| 347,676 | 8/1886 | White | 279/123 |
| 522,651 | 7/1894 | Cole | 279/123 X |
| 4,623,154 | 11/1986 | Ise et al. | 279/1 L |

FOREIGN PATENT DOCUMENTS 0137503  8/1983  Japan ........................ 82/150

OTHER PUBLICATIONS

"Expanding Tailstock Chuck Grips Large Casings", Metalworking Production, Sep. 28, 1956.

Primary Examiner—Z. R. Bilinsky
Attorney, Agent, or Firm—Michael J. McGowan; Prithvi C. Lall; Michael F. Oglo

[57] ABSTRACT

A spider fixture provides a rotatable connection between a workpiece and a lathe. The spider fixture has a tapered shaft adapted to be inserted and secured to the tail stock of the lathe and rotatably mounted to the remainder of the spider. In addition the portion of the spider fixture that is rotatably mounted to the tapered shaft has adjustable holding pieces that extend radially from the spider to secure the spider to the inner shell of the workpiece.

5 Claims, 2 Drawing Sheets

ADVANCED SPIDER FIXTURE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a spider fixture. More particularly the invention prevents radial run-out while machining a torpedo body and enables machining the internal and external surfaces of the body while it is set up in the tail stock of a lathe.

(2) Description of the Prior Art

Prior to the present invention the tail stock of the lathe was driven into a fixture. However, this fixture was never attached to the tailstock. This procedure took a long time to set up accurately and was dangerous for the workman involved.

SUMMARY OF THE INVENTION

Accordingly, it is a general purpose and object of the present invention to provide an improved assembly for machining a cylindrical workpiece. It is an additional object that the assembly be suitable for machining a tapered cylindrical tail section of a torpedo.

These objects are accomplished with the present invention by providing an assembly in which an advanced spider suitable for holding the tail section of a torpedo is used in conjunction with a lathe. The spider fixture has a tapered shaft adapted to be inserted and secured to the tail stock of the lathe and rotatably mounted to the remainder of the spider. In addition the portion of the spider fixture that is rotatably mounted to the tapered shaft has adjustable holding pieces that extend radially from the spider to secure the spider to the inner shell of the workpiece.

BRIEF DESCRIPTION OF THE DRAWINGS

FIGS. 4a and 4b are views of a pad that fits over the holding screw of FIGS. 3a and 3b, FIG. 4b being along the line 4b—4b of FIG. 4a; and FIGS. 5a and 5b are views of the slidable support block of FIGS. 1 and 2, FIG. 5b being along the line 5b—5b of FIG. 5a.

DESCRIPTION OF THE PREFERRED EMBODIMENT

Figure 1:
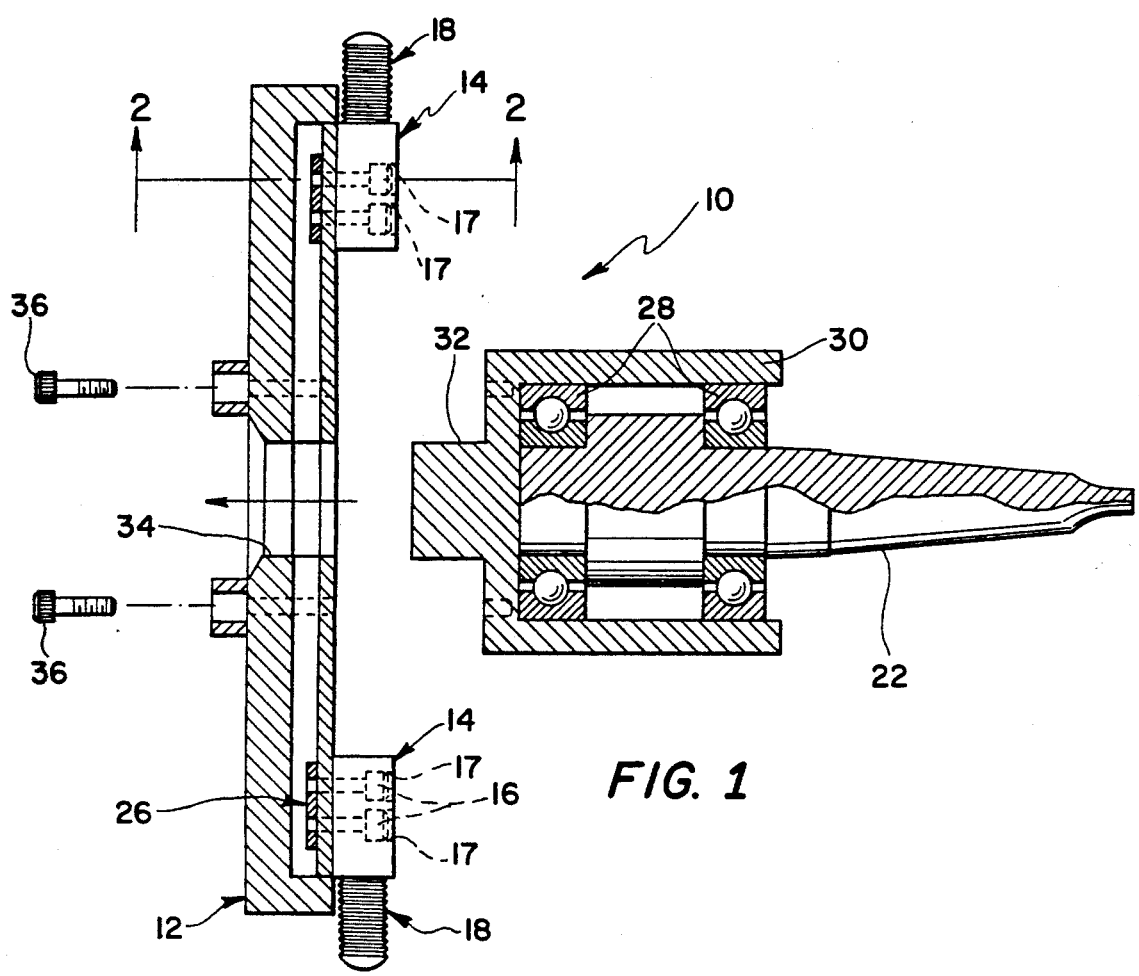
FIG. 1 is a cross-sectional view of an advanced spider fixture in accordance with the present invention.

Referring now to FIG. 1 there is shown a cross-sectional view of an advanced spider fixture 10. The spider lo includes a base plate 12 on which is attached four slidable support blocks 14 located near the outer circumference of the base plate 12 and separated from each other by 90°. Each block 14 is clamped to base plate 12 by two mounting screws 16 which attach to a slidable clamp block 26 through apertures 17 in block 14. An adjustable holding screw 18 extends radially from each block 14 for contacting the inside surface of a workpiece (not shown). The tapered shaft 22 from spider fixture 10 is for insertion in the tail stock of a lathe (not shown). The rotatable tapered shaft 22 is mounted on a pair of bearings 28 that are encased in a bearing housing 30 The bearings 28 are press fit on both the tapered shaft 22 and the bearing housing 30. Housing 30 has a cylindrical boss 32 extending from the end opposite tapered shaft 22. A corresponding aperture 34 is provided through the axis of base plate 12. The diameters of the cylindrical boss 32 of housing 30, and aperture 34 of base plate 12, are of a size to enable a press fit between the components. Once pressed together, housing 30 is further secured to base plate 12 by means of screws 36.

Figure 2:
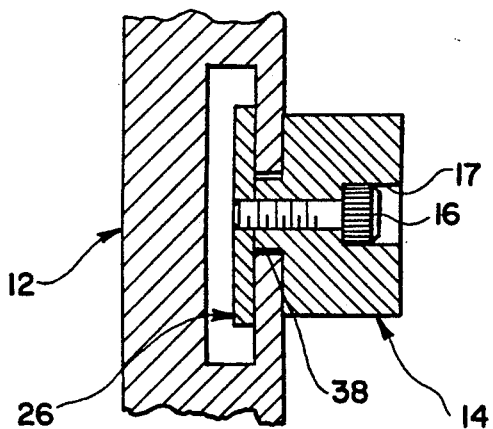
FIG. 2 is a view of an adjustable attachment arrangement along line 2—2 of FIG. 1.

Refer now to FIG. 2 for a sectional view of the base plate 12, the support block 14, and the clamp block 26 taken along line 2—2 of FIG. 1. The support block 14 and the clamp block 26 are slidable along the aperture 38 of the base plate 12. The screw 16, shown in FIG. 2, holds support block 14 and clamp block 26 to the base plate 12 in position relative to each other.

Figure 3A:
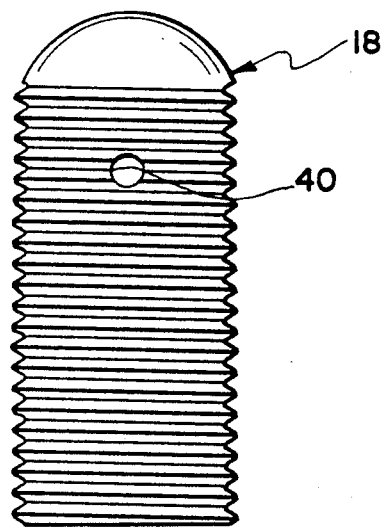
FIGS. 3a and 3b show views of the holding screw of FIG. 1.
Figure 3B:
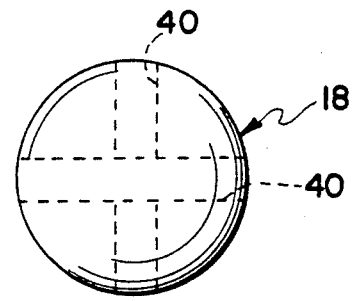

FIGS. 3a and 3b show adjustable holding screw 18 which extends from block 14 as shown in FIG. 1. There are two orthogonal through holes 40 in holding screw 18 for adjusting the screw 18 to provide pressure against the work piece.

Figure 4A:
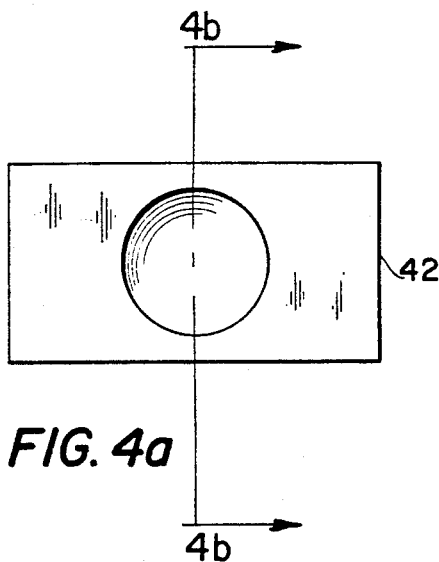
Figure 4B:
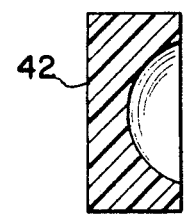

FIGS. 4a and 4b show a pivoting pad 42 that can be placed between the work piece and the holding screw 18. The pivoting pad 42 can be of different sizes and contours and is pre-selected to fit a particular workpiece.

Figure 5A:
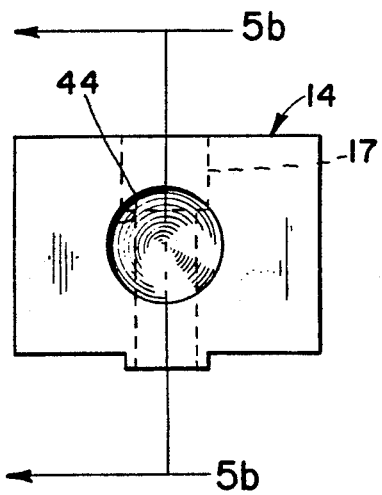
Figure 5B:
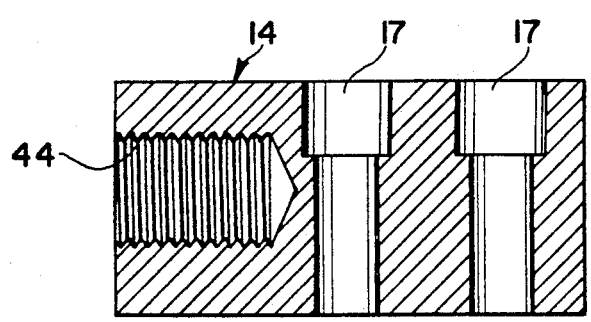

FIGS. 5a and 5b show the slidable support block 14 into which the adjustable holding screw 18 of FIGS. 1, 3a, and 3b is mated in threadable aperture 44. Screws 16 of FIG. 1 are inserted through apertures 17.

There has therefore been described an improved spider fixture that improves on the prior method of driving the tail stock firmly into a fixture as was done previously. This is particularly important when working with tapered shells where axial forces can push the fixture out of place resulting in damage to the work piece and possible operator injury.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A spider for providing a rotatable interface comprising:

a circular base plate having a plurality of spaced radially disposed undercut grooves near the outer circumference thereof and an aperture at its axis;

a plurality of first and second clamping pieces with respective members of said first and second clamping pieces clamped to said base plate at said undercut radial grooves, said first and second clamping pieces being adjustable in the radial direction with respect to said base plate;

a plurality of holding screws, one each of said screws being affixed to one of said first clamping pieces, each of said screws having adjustable means for extending further outward in a radial direction than said first clamping piece to which it is affixed and than said base plate;

a housing having a cylindrical boss for being secured with said base plate at said aperture of said base plate; and a tail piece rotatably connected to said housing.

2. A spider for providing a rotatable interface according to claim 1 further comprising a plurality of bearings encased in said housing and rotatably securing said tail piece with said housing.

3. A spider for providing a rotatable interface according to claim 2 further comprising:

said plurality of first clamping pieces further comprise slidable support blocks and said plurality of second clamping pieces further comprise slidable clamp plates with respective members of said slidable support blocks and said slidable clamp plates being affixed to said base plate at respective undercut grooves; and a plurality of holding devices inserted through respective members of said slidable clamp plates, said slidable support blocks at respective undercut grooves for securing said slidable clamp plates and said slidable support blocks to said base plate.

4. A spider for providing a rotatable interface according to claim 3 wherein said housing boss has a diameter slightly larger than the diameter of said aperture of said base plate thereby forming a press fit connection therebetween.

5. A spider for providing a rotatable interface according to claim 4 wherein said housing is further secured to said base plate with a plurality of fasteners.

* * * * *